United States Patent
Law et al.

(10) Patent No.: US 7,420,926 B2
(45) Date of Patent: ***Sep. 2, 2008

(54) METHOD AND APPARATUS FOR PROVIDING INTEGRAL CELL PAYLOAD INTEGRITY VERIFICATION AND DETECTING DEFECTIVE MODULES IN TELECOMMUNICATION DEVICES

(75) Inventors: Allan Randall Law, Surrey (CA); Steven Douglas Margerm, Surrey (CA); Andre Poulin, Hull (CA); Robert Morton, Nepean (CA); Steve Driediger, Kanata (CA); Jason Sterne, Ottawa (CA); Paul Nadj, Ottawa (CA)

(73) Assignee: Alcatel-Lucent Canada Inc., Ottawa, Ontario (CA)

( * ) Notice: Subject to any disclaimer, the term of this patent is extended or adjusted under 35 U.S.C. 154(b) by 771 days.

This patent is subject to a terminal disclaimer.

(21) Appl. No.: 10/865,870

(22) Filed: Jun. 14, 2004

(65) Prior Publication Data

US 2004/0233853 A1    Nov. 25, 2004

Related U.S. Application Data

(63) Continuation of application No. 09/476,374, filed on Jan. 3, 2000, now Pat. No. 6,771,605, which is a continuation-in-part of application No. 09/417,834, filed on Oct. 14, 1999, now Pat. No. 6,639,899.

(51) Int. Cl.
*G01R 31/08* (2006.01)
*G06F 11/00* (2006.01)

(52) U.S. Cl. ................ 370/242; 370/252; 714/799

(58) Field of Classification Search .......... 370/241–252, 370/389, 392, 396–399, 395.1; 714/48, 758, 714/799
See application file for complete search history.

(56) References Cited

U.S. PATENT DOCUMENTS 5,142,653 A    8/1992    Schefts (Continued)

FOREIGN PATENT DOCUMENTS

EP    0516042 A2    12/1992

(Continued)

OTHER PUBLICATIONS

Search Report for European Patent Application No. EP00460043, European Patent Office, Jan. 25, 2005, pp. 1-2.

(Continued)

*Primary Examiner*—Chi H. Pham
*Assistant Examiner*—Tri H. Phan
(74) *Attorney, Agent, or Firm*—Oyen Wiggs Green & Mutala LLP

(57) ABSTRACT

A method for identifying faulty modules within telecommunication devices, such as ATM switches, involves generating and attaching verification codes, such as a CRC or checksum codes, to data packets at an upstream location determining the integrity of the verification codes at each of multiple downstream location within a telecommunication device; and signaling an error condition where a corrupted data packet has been detected. A verification code may be written to a field of a data packet which is not used while the packet is in transit through the telecommunication device.

17 Claims, 9 Drawing Sheets

U.S. PATENT DOCUMENTS

| | | |
|---|---|---|
| 5,491,697 A | 2/1996 | Tremel et al. |
| 5,513,191 A * | 4/1996 | Takechi et al. ............... 714/752 |
| 5,513,339 A | 4/1996 | Agrawal et al. |
| 5,548,598 A | 8/1996 | Dupont |
| 5,675,587 A | 10/1997 | Okuyama et al. |
| 5,757,775 A | 5/1998 | Yokoyama et al. |
| 5,872,910 A | 2/1999 | Kuslak et al. |
| 5,878,063 A | 3/1999 | Kawasaki et al. |
| 5,951,707 A | 9/1999 | Christensen et al. |
| 6,003,146 A | 12/1999 | Beutler |
| 6,088,826 A * | 7/2000 | Teich ......................... 714/774 |
| 6,289,037 B1 | 9/2001 | Gibbons et al. |
| 6,317,855 B1 | 11/2001 | Horibe |
| 6,396,811 B1 | 5/2002 | Petersen |
| 6,477,141 B1 | 11/2002 | Izawa et al. |
| 6,539,503 B1 | 3/2003 | Walker |

FOREIGN PATENT DOCUMENTS

WO    WO 8909965 A1    10/1989

OTHER PUBLICATIONS

L. Zhang et al., "A Forward Error Protection Scheme for B-ISDN Using a Virtual Path (VP) Technique", A.T.R., vol. 23, No. 2, 1989, pp. 1-9.

\* cited by examiner

METHOD AND APPARATUS FOR PROVIDING INTEGRAL CELL PAYLOAD INTEGRITY VERIFICATION AND DETECTING DEFECTIVE MODULES IN TELECOMMUNICATION DEVICES

CROSS REFERENCE TO RELATED APPLICATION

This application is a continuation of application Ser. No. 09/476,374 and entitled METHOD AND APPARATUS FOR PROVIDING INTEGRAL CELL PAYLOAD INTEGRITY VERIFICATION IN ATM TELECOMMUNICATION DEVICES which is a continuation-in-part of commonly owned application Ser. No. 09/417,834 filed 14 Oct. 1999 and entitled METHOD AND APPARATUS FOR PROVIDING INTEGRAL CELL PAYLOAD INTEGRITY VERIFICATION IN ATM TELECOMMUNICATION DEVICES, now U.S. Pat. No. 6,639,899.

TECHNICAL FIELD

This invention relates generally to telecommunication networks. Specific embodiments of the invention relate to asynchronous transfer mode (ATM) networks. The invention relates more specifically to the detection of errors in the data payloads of data packets being handled by telecommunication devices and to the identification of specific malfunctioning modules within such telecommunication devices which cause data packet payload corruption. The data packets may be, for example, ATM cells, IP packets, frame relay packets or the like.

BACKGROUND

In a data telecommunication network, data is broken into data packets which are forwarded from sources to destinations. The data packets may all have the same fixed size as do ATM cells or may have variable lengths as do IP packets. Typically each cell includes a header which includes information about the data packet, including its destination and a data payload. According to the current ATM specification, each ATM cell is 53 bytes long and consists of a 48-byte payload and a 5-byte header.

The network comprises a number of data transmission links which are connected to one another at nodes. In traversing the network the data packets are passed along the transmission links from node to node. One or more telecommunication devices are located at each node. The telecommunication devices may have, between themselves, various functions including directing received packets to the appropriate outgoing transmission link.

For example, in an ATM network a number of virtual circuit connections (VCCs) are set up between pairs of end points on the network. Streams of ATM cells can be sent along each virtual circuit connection. In passing along a virtual circuit connection, each ATM cell typically passes through one or more ATM switches. The ATM switches direct the cells so that each cell will arrive at its intended end point. A challenge facing the designers of ATM networks is the very high speeds at which ATM cells must be passed through the network and switched by network switches. ATM cells can become corrupted as they pass through an ATM network for various reasons including hardware faults, hardware failures, and software errors which might, for example, cause certain components within an ATM switch to be improperly configured.

There are many systems for measuring the end-to-end performance of connections provided by an ATM network. Such systems typically measure the performance of end-to-end channels across an ATM network. While there are methods for determining the node in an ATM network at which faults are occurring such methods do not facilitate the location of specific faulty cards or modules of telecommunication devices on the ATM network. In studying the source of errors in ATM networks it is often assumed that errors arise in the communication links connecting switches in the network and that network switches perfectly transmit all ATM cells which they receive. ATM networks typically include many telecommunication devices. Each such device typically includes modules which may occasionally, if rarely, fail in ways which result in corruption of some ATM cells. Some such failures may be intermittent in nature. It is therefore almost inevitable that a practical ATM network will occasionally encounter situations where ATM cells become corrupted as they traverse the ATM network. In most practical ATM networks the localization of intermittent errors to particular switches or to particular portions of switches can be very difficult with prior methods.

Most standards governing the manner in which ATM cells are passed over the physical links which connect telecommunication devices in ATM networks include error detection protocols. There are no such standards for detecting ATM cells which become corrupted within telecommunication devices.

There is a need for an effective way to detect and localize errors which result in the corruption of data payloads in ATM cells. In particular, there is a need for effective methods and apparatus capable of identifying specific cards or modules within ATM telecommunication devices at which ATM cells are being corrupted. There is a particular need for such methods and apparatus which fully cover data paths within ATM telecommunication devices and do not merely cover specific interfaces between devices or functions internal to a telecommunication device, such as a switch. Such data paths may include several buffers, interfaces, connections etc. as they pass through a telecommunication device.

SUMMARY OF THE INVENTION

This invention provides methods and apparatus for evaluating the performance of devices in telecommunication networks. Particular embodiments are directed to identifying faulty telecommunication devices which cause corruption of packets. More specific embodiments are directed to identifying faulty modules within a telecommunication device.

Another aspect of the invention provides a method for locating a faulty module in a packet handling device in a telecommunication network. The device has a data path for carrying data packets and the data path passes through a plurality of modules in the device. The method comprises: at a plurality of locations on the data path within the device reading an integrity verification code from the packet and determining if the integrity verification code matches the packet; and, if the integrity verification code at one of the locations does not match the packet, generating a signal indicating that the packet is corrupted.

This invention may be applied to verify the integrity of the data payloads of ATM cells within ATM telecommunication devices, such as ATM switches. The methods of the invention involve generating a payload integrity verification code for ATM cells entering a telecommunication device. The payload integrity verification code is attached to the cell. At one or more downstream locations within the telecommunications device the payload integrity verification code is checked to determine whether it matches the cell data payload. This may be done by recalculating the payload integrity verification code and comparing it to the originally calculated payload integrity verification code. Preferably the payload integrity verification code is checked at multiple downstream locations to permit the identification of defective modules within the telecommunication device.

In some embodiments of the invention the payload integrity verification code is written to the VPI/VCI fields of the cell (i.e. one or more of the 5th through 28th bits of the 5 byte ATM cell header). While an ATM cell is in transit through a telecommunication device the VPI field, the VCI field, or both the VPI AND VCI fields are often irrelevant. Therefore one can surprisingly provide cell payload integrity verification by including a payload integrity verification code in VPI field and/or the VCI field without adversely affecting throughput of the telecommunication device. The payload integrity verification code may be a checksum, a CRC-8 value, a CRC-4 value, a parity bit, a BIP code or another suitable error correction or error detection code. In other embodiments of the invention the payload integrity verification code is included in an additional header or trailer attached to an ATM cell.

Further aspects and advantages of the invention are described below.

BRIEF DESCRIPTION OF DRAWINGS

In drawings which illustrate non-limiting embodiments of the invention.

DESCRIPTION

This invention is described below in the context of an ATM network comprising a number of ATM switches. As described below, certain embodiments of the invention have application in telecommunication networks and devices generally. Other embodiments of the invention have application in ATM networks which differ from the example ATM network described below.

Figure 1:
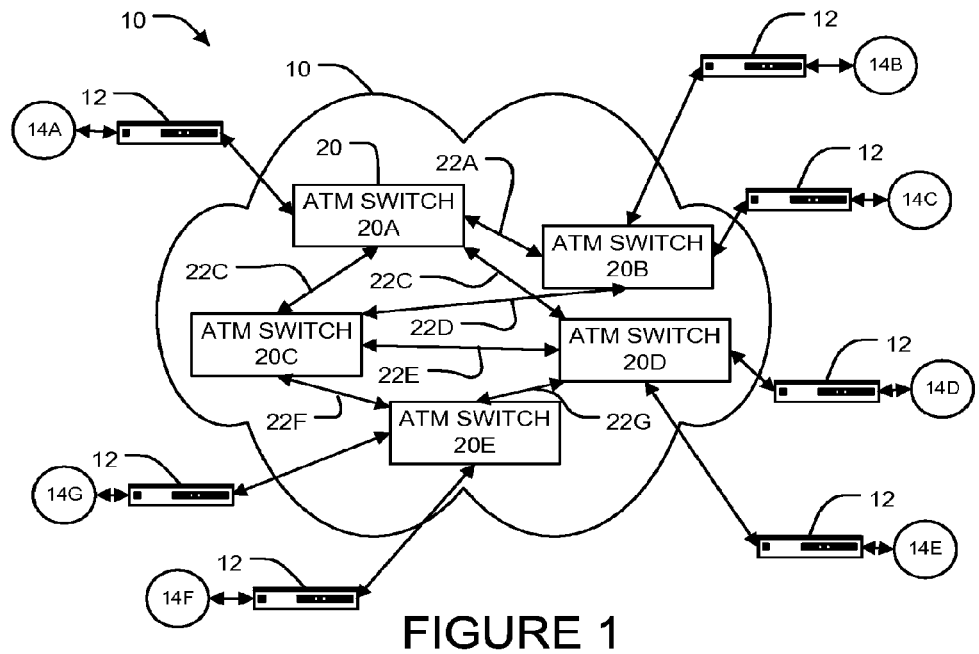
FIG. 1 is a schematic illustration of a simple prior art ATM network.

FIG. 1 illustrates a simple ATM network 10. Network 10 permits data to be interchanged between a number of network edge devices 12. Each network edge device 12 provides at least one end point. The simple network of FIG. 1 permits data to be interchanged between 7 end points 14A through 14G.

Network 10 comprises 5 ATM switches 20 linked by communication links 22. Communication links 22 typically comprise fiber-optic cables but may also comprise wired or wireless connections. Communication links 22 may carry ATM cells by any of a variety of physical layer protocols.

Figure 2A:
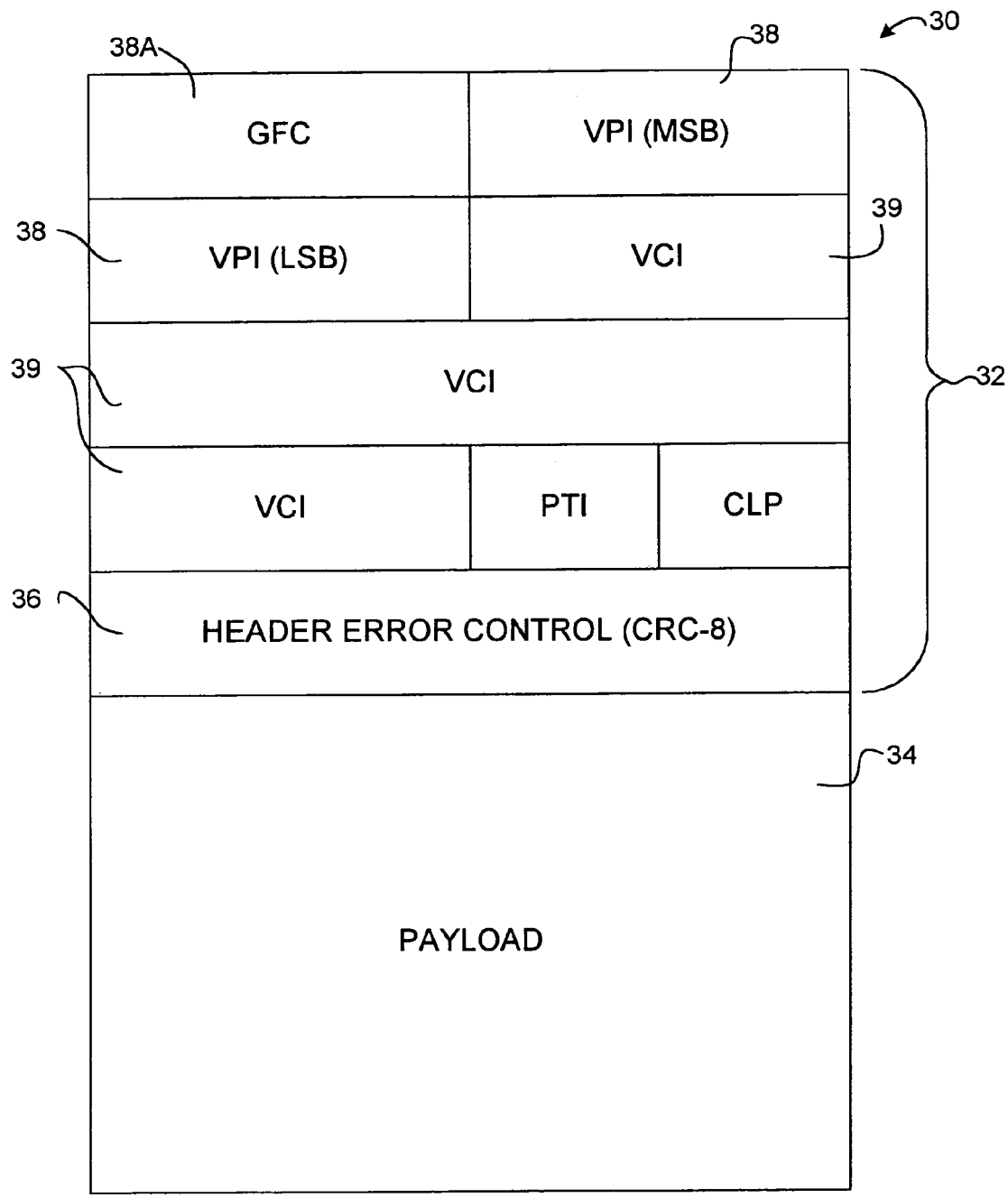
FIG. 2A is a diagram illustrating a structure of a User-Network Interface ATM cell.
Figure 2B:
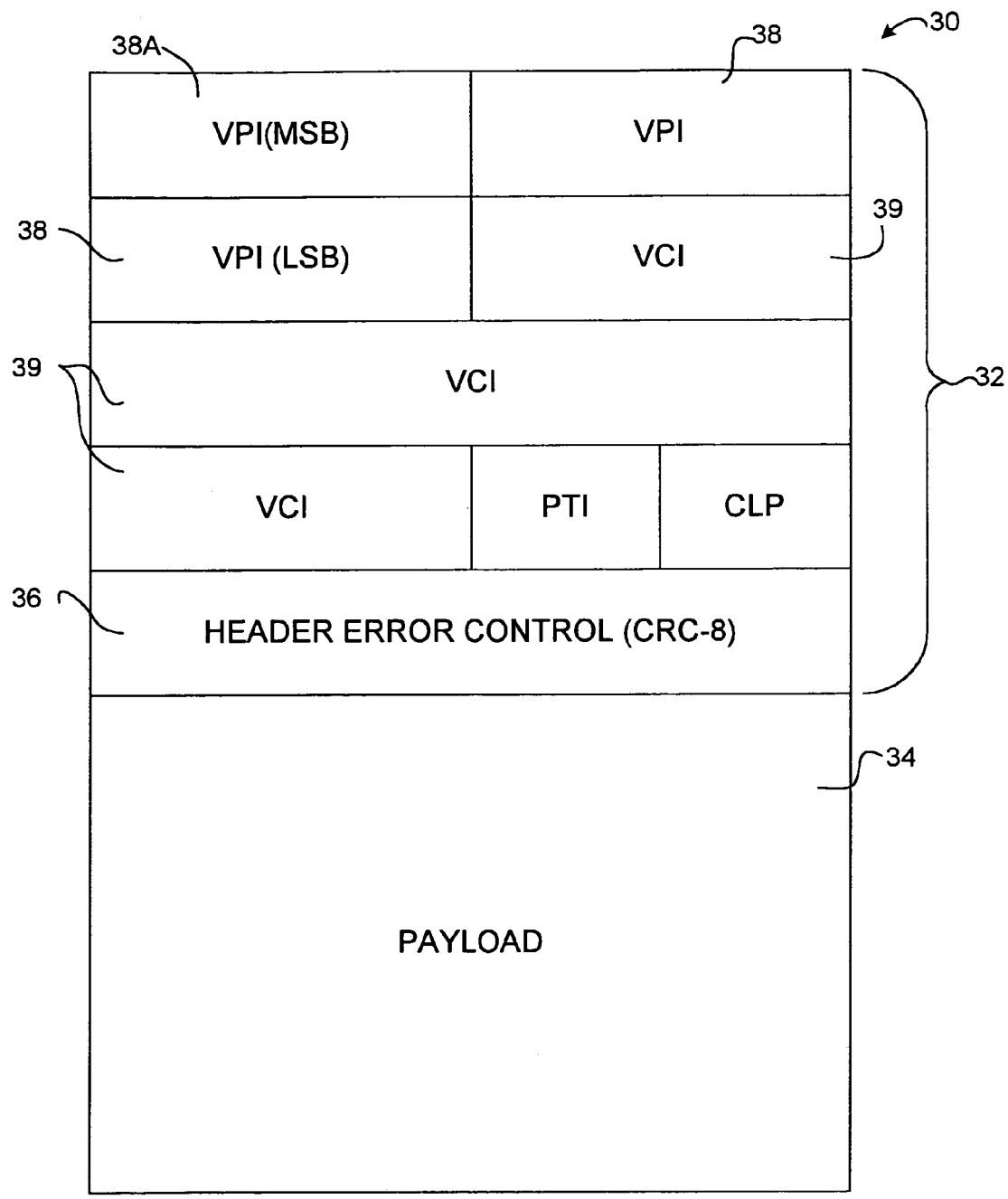
FIG. 2B is a diagram illustrating a structure of a Network-Network Interface ATM cell.

FIG. 2A shows the structure of an ATM cell 30 according to the current ATM standard. The cell 30 of FIG. 2A is a User Network Interface ("UNI") cell. UNI cells are used in the interface between an ATM endpoint and an ATM switch. Cell 30 comprises a 5-byte header 32 and a 48-byte payload 34. Cell 30 has a total of 53 bytes. Header 32 has a number of fields including a virtual path identifier ("VPI") field 38, a virtual channel identifier ("VCI") field 39 and a header error control byte 36. In UNI ATM cells, a portion 38A of VPI field 38 is allocated as a generic flow control field ("GFC"). In this specification the term "VPI field" includes any portion of the VPI field which may be allocated to GFC. In a standard ATM cell the VPI field is allocated 12 bits (including any bits allocated for GFC). In the interfaces between switches 20, ATM cells have no GFC field. Such cells are called Network Network Interface ("NNI") cells. An NNI ATM cell 30 according to the current ATM standard is shown in FIG. 2B.

Any link 22 in network 10 will typically be carrying ATM cells 30 for a number of different VCCs at any given time. As the destination of each cell is specified by the combination of the cells virtual path and virtual channel (VPI/VCI) it is necessary to operate network 10 in such a manner that there is never a case where cells belonging to different VCCs traversing a single link 22 have the same VPI/VCI value. Because VCCs are being set up and taken down on a continuous basis it is generally impractical to assign VPI/VCI values to each VCC in a manner which ensures that the above-noted situation will never arise. Consequently, ATM networks assign values of VPI and VCI for each link 22.

Figure 3:
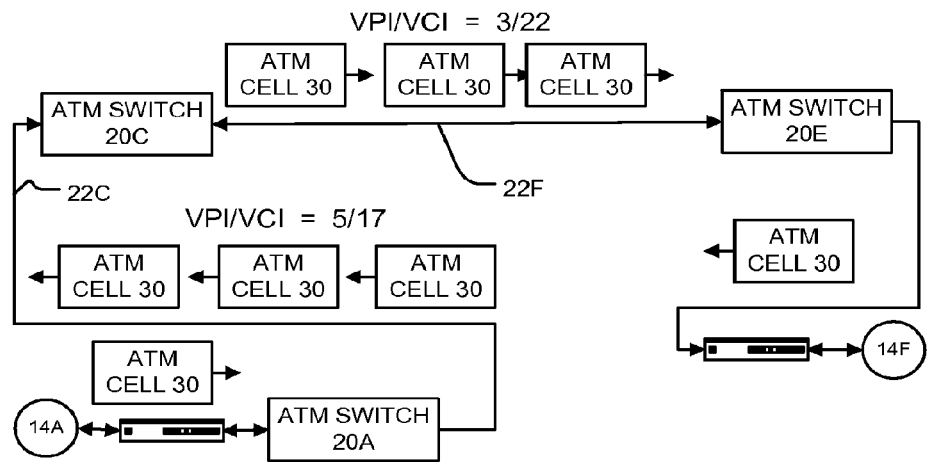
FIG. 3 is a schematic view illustrating a possible virtual circuit connection provided by the network of FIG. 1.

FIG. 3 shows an example of a possible VCC connecting end points 14A and 14F. Cells in the VCC are delivered to switch 20A and then travel to switch 20C via link 22C. The cells then travel through switch 20E on link 22F. Finally the cells are delivered by switch 20E to end point 14F. In the given example, cells are assigned the VPI/VCI 5/17 for the time they are traversing link 22C and are assigned the VPI/VCI 3/22 for the time they are traversing link 22F. These values are chosen at the time the VCC is set up so as not to conflict with the VPI/VCI values for any other VCC traversing links 22C or 22F respectively.

At switch 20A, each packet in the VCC is assigned the VPI/VCI 5/17. These values are written to the VPI and VCI fields in the cell header 32 for each cell travelling in the VCC. In switch 20C the VPI/VCI pair 5/17 is read and switch 20C determines that the appropriate VPI/VCI for link 22F is 3/22. Switch 20C therefore writes VPI equal to 3 in the VPI field 38 of cell 30, writes VCI equal to 22 in the VCI field 39 of cell 30 and forwards cell 30 out the port connected to link 22F for delivery to switch 20E.

Cells 30 may become unintentionally corrupted as they transit between endpoints 14A and 14F due to malfunctioning components. Switches 20A, 20C and 20E operate at very high speeds. It is possible that the header or payload of any cell 30 may become corrupted in passing through a switch. A cell may become corrupted due to faulty hardware, transient events such as the interaction of gamma rays with memory devices inside a switch, power fluctuations or the like. It can be difficult to determine where corrupted cells are being corrupted. Cells 30 could be corrupted as they pass through one of communication links 22C or 22F, or one of switches 20A, 20C or 20E, or one of network edge devices 12, or in the communication links 22 connecting edge devices 12 with switches 20A and 20E respectively.

Figure 4:
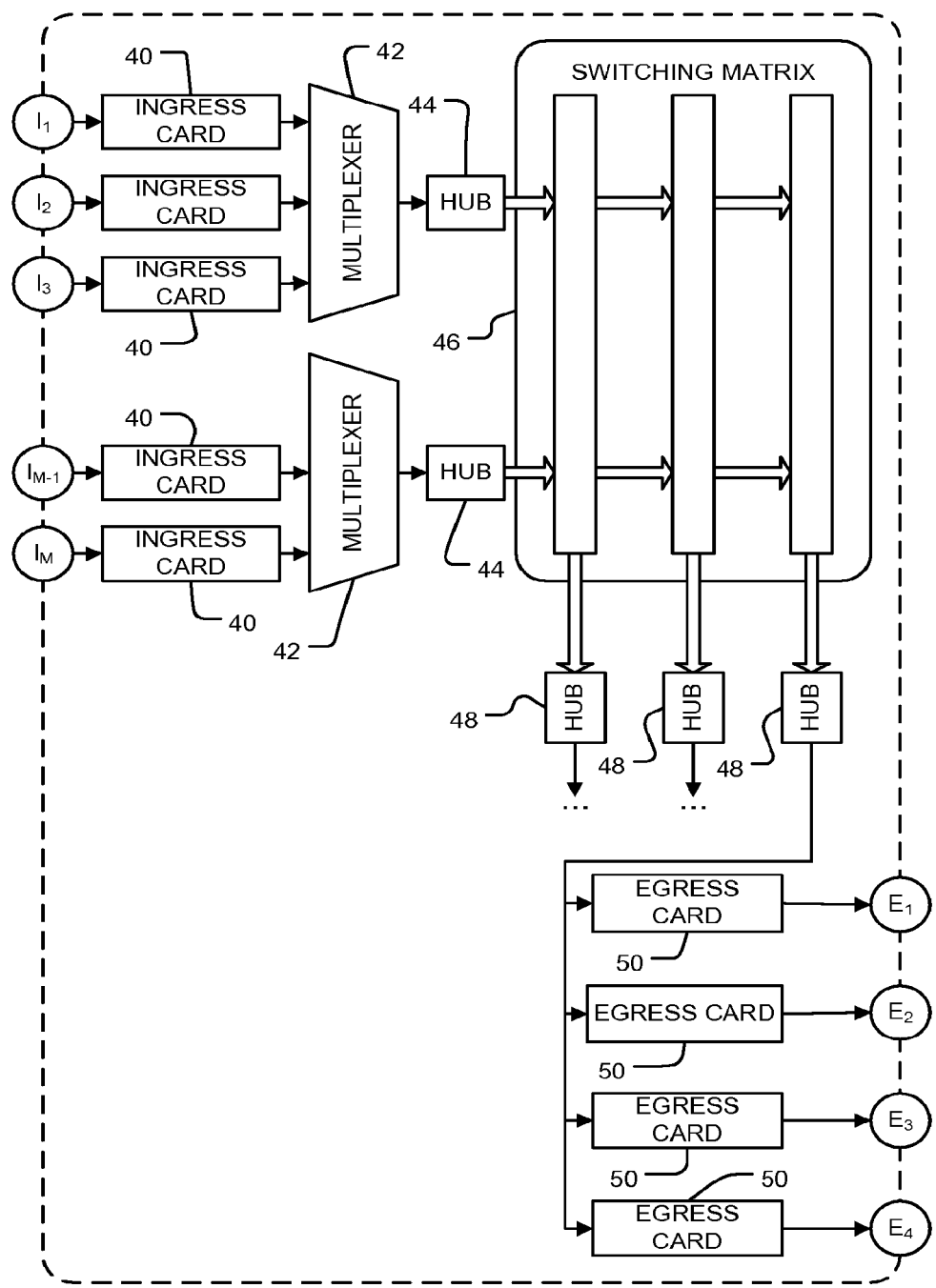
FIG. 4 is a block diagram of some main functional components of one type of ATM switch.

FIG. 4 illustrates a typical ATM switch 20. Switch 20 has a number of ingress ports I and a number of egress ports E. Cells are received at ingress ports I which are typically located on ingress cards 40. Cells from several ingress cards 40 may be passed to a multiplexer 42 and to a hub 44. Hub 44 passes the cells into a switching matrix 46. Switching matrix 46 selectively directs the cells to one of several hubs 48. From hubs 48 the cells are directed to egress cards 50 which are each connected at one of egress ports E to an outgoing link 22. As is known to those skilled in the art there are many possible designs for ATM switches. By way of example only, some ATM switches do not have multiplexers 42, some ATM switches do not have hubs 44, in some ATM switches functions are divided between different cards in a different manner from that illustrated in FIG. 4.

Typically, at ingress cards 40 the VPI/VCI information for each cell is read and converted to a connection identifier which is used internally in switch 20. The connection identifier identifies the egress port to which the cell should be directed and also specifies the VCC to which the cell in question belongs. At egress ports 50 the connection identifier is used to determine the VPI/VCI to be used for the cell on the next communication link 22. The connection identifier is typically included as part of an additional proprietary header which is added to the cell at an ingress card 40. In order to maximize throughput of switch 20 and to keep switch 20 simple, it is generally desirable to keep the size of the proprietary header to a minimum.

While it is not illustrated here, an ATM switch such as the one shown in FIG. 4 typically includes parallel redundant fabric such that if there is a failure in one part of this fabric the switch can continue to operate. Furthermore, the switch typically includes a number of independently replaceable modules, such as separate circuit boards, which can be individually removed and replaced to correct any problems which may develop. Data corruption may occur on any module within switch 20 which may malfunction.

This invention detects corruption of payloads 34 which occur inside an ATM telecommunication device, such as a switch, by computing a payload integrity verification code for the payload of each cell. The payload integrity verification code is preferably computed and attached to cells 30 at a point which is as close as practical to the ingress where cells 30 enter the telecommunication device.

Figure 5:
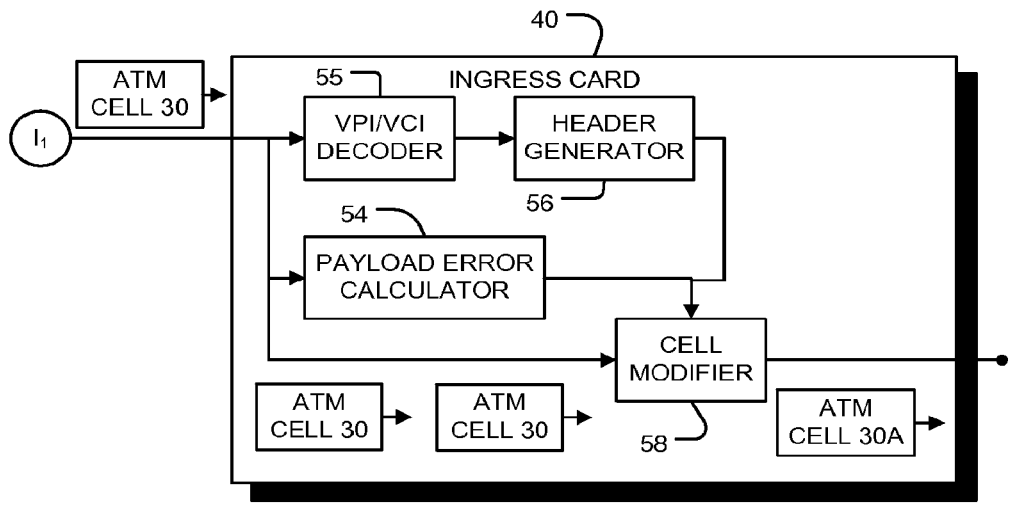
FIG. 5 is a block diagram illustrating selected functional components of an ingress card in an ATM switch according to the invention.

FIG. 5 shows an example of an ingress card 40 which includes apparatus for practising the invention. For clarity, ingress card functional elements which are not directly related to the practice of this invention are not shown in FIG. 5. Ingress card 40 includes a payload integrity verification code computation circuit 54 which computes a payload integrity verification code for each cell 30 received at ingress $I_1$. Depending upon the number of bits available for carrying the payload integrity verification code the payload integrity verification code may be for example a CRC-8 value, a CRC-4 value, a parity bit or another suitable error detection code. The payload integrity verification code is associated with a cell 30 by cell modifier 58 and is forwarded with cell 30 through the switch 20. Cells modified by cell modifier 58 are labelled 30A. Depending upon what algorithm is used to generate the payload integrity verification code, some errors may go undetected. For example, a cell might become corrupted in such a way that the CRC-4 value calculated for the corrupted cell is the same as the CRC-4 value calculated for the cell before it was corrupted. A CRC-8 value will provide better coverage than a CRC-4 value which will, in turn, provide better coverage than a parity bit.

In a preferred embodiment of this invention, ingress card 40 includes a VPI/VCI decoder 55 which reads the VPI/VCI value for each cell and identifies a cell stream to which each cell belongs. VPI/VCI decoder 55 identifies a connection identifier ("CI") for the cell. The connection identifier is typically included in an additional header which is generated by a header generator 56. The additional header 32A generated by header generator 56, is added to the cell 30 at cell modifier 58. While it is not conventional to do so, the CI could also be included in a trailer added to each ATM cell. Methods and apparatus suitable for identifying cell streams and generating additional cell headers or trailers are well understood to those skilled in the art and will therefore not be described herein.

The payload integrity verification code generated by payload error calculator 54 is written into cell 30. In some embodiments of the invention the payload integrity verification code is written to all, or a portion of, the VPI/VCI fields 38, 39 for the cell. As noted above, the VPI and/or VCI fields are not required within switch 20 because the destination of the cell is specified by connection identifier 62. On egress from switch 20 the VPI and/or VCI values for any cell will be set to new, probably different, values which will apply for the next hop to be taken by the cell 30 on the next link 22. By reusing one or both of the VPI/VCI fields, or portions of one or both of those fields, for payload integrity verification code information while the cell is passing through a switch 20, one arrives at the useful and surprising result that one can add a payload integrity verification code to cells 30 passing through switches 20 to enable the detection of payload corruption within the switch 20 without increasing the size of the cells 30A traversing the switch 20.

In some types of ATM switching the VCI field is not rewritten at the egress of the switch but the VPI field is rewritten. In such cases the payload integrity verification code information may be included in all, or a portion of the VPI field of ATM cells.

If the payload integrity verification code is written into the VPI and/or VCI fields of cells then preferably a flag in an additional header or trailer of the cell is set to indicate that the VPI and/or VCI fields contain the payload integrity verification code. In some cases the methods of the invention will not be applied to all cell streams in a telecommunication device. In such cases the flag is needed so that downstream error checkers do not attempt to interpret as payload integrity verification codes VPI and/or VCI values in those cells belonging to streams which do not have payload integrity verification codes written to their VPI/VCI fields.

Figure 6:
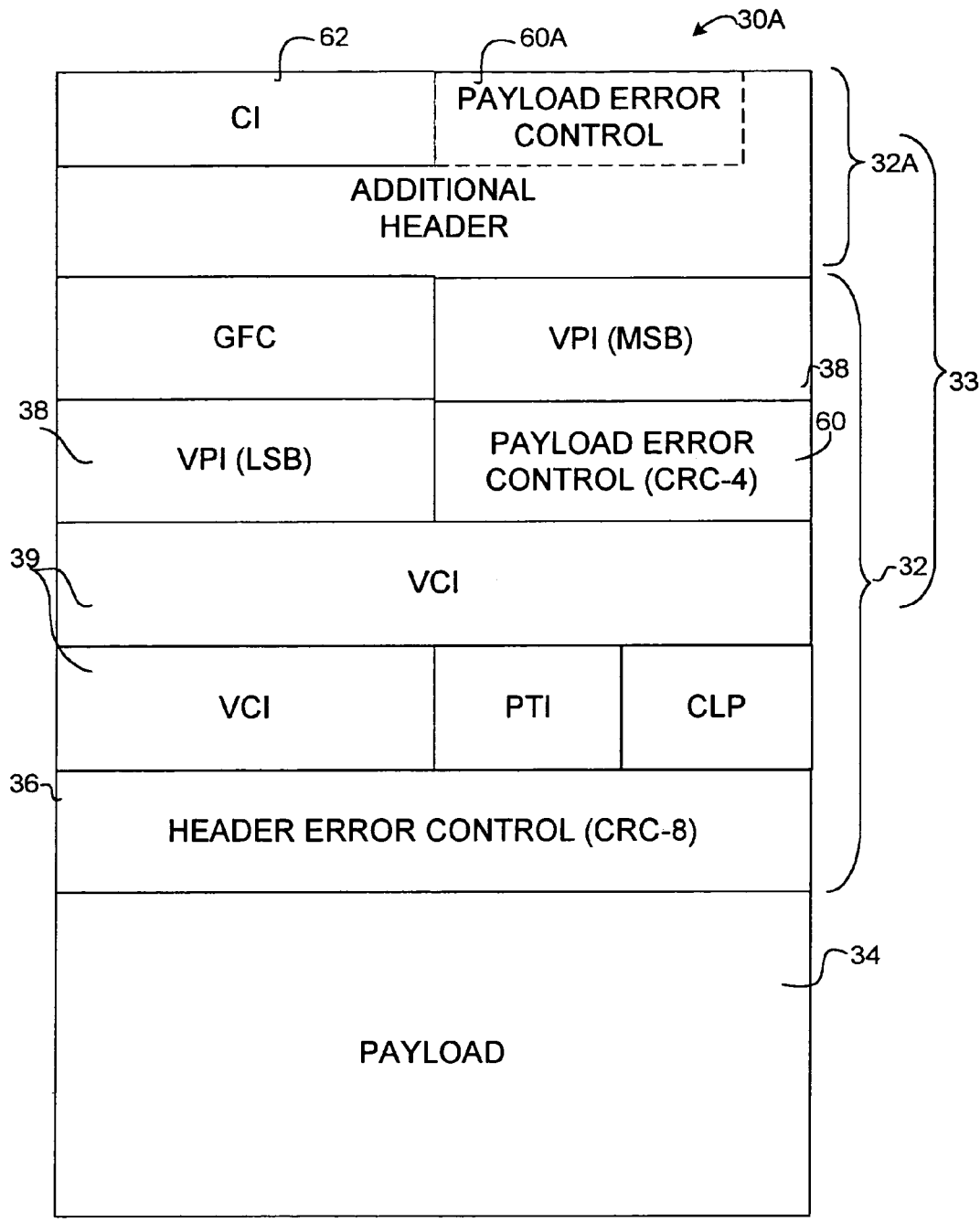
FIG. 6 is a signal according to the invention being propagated through an ATM switch.

The payload integrity verification code computed by payload error calculator 54 may also be included as part of the proprietary header (or trailer) which is added to the cell 30 by cell modifier 58. For example, FIG. 6 shows an ATM cell having a payload integrity verification code 60A in additional header 32A. This embodiment of the invention has the advantage that it permits a payload integrity verification code to be attached to a cell 30 even before the cell is processed by VPI/VCI decoder 55. As noted above it is desirable to attach the payload integrity verification code to a cell at a location which is close to the point at which the cell enters a switch or other telecommunication device. This embodiment may not be ideal in some cases because adding cell payload integrity verification codes to the additional header increases the minimum size of the additional header. This will negatively impact the throughput of switch 20 unless the data paths within switch 20 have been designed to have capacity sufficient to contain ATM cells having additional headers large enough to contain the payload integrity verification codes at the switch's maximum designed-for throughput. Providing such capacity can increase the complexity and cost of a switch or other telecommunication device.

FIG. 6 shows an example of the format of a signal 30A representing a cell 30 traversing a switch 20. Signal 30A may be, at various times, embodied as a data structure within a memory in switch 20, as electrical signals on a bus within switch 20, or as optical signals on an optical bus within switch 20.

Signal 30A has a payload 34, and a header 33. Header 33 has a header 32, as described above, with the exception that a payload integrity verification code 60 is included in all, or part of VPI/VCI fields 38, 39. In the example of FIG. 6, the payload error correction code occupies the highest order 4 bits of the VCI field. Header 33 also comprises an additional header 32A which includes at least a connection identifier field 62. Preferably, header error control field 36 comprises a CRC-8 checksum, or other header error control value which is computed for all of header 33, and not merely header 32. It is important to detect errors in header 33 because an error in header 33 could result in a cell being delivered to an unintended destination. If a cell 30 has an error in header 33 then the cell 30 is preferably discarded.

Figure 7:
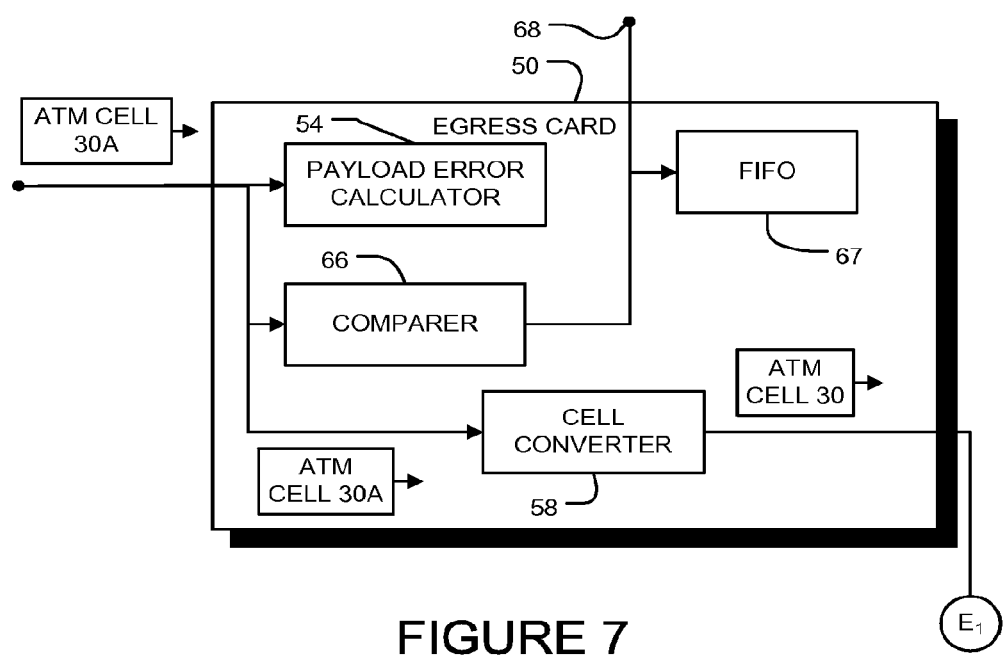
FIG. 7 is a block diagram illustrating selected functional components of an egress card in an ATM switch according to the invention.

As shown in FIG. 7, egress card 50 includes a payload integrity verification circuit. In the embodiment of FIG. 7 the payload integrity verification circuit comprises a second payload integrity verification code calculator 54 and a comparison circuit 66. Second payload integrity verification code calculator 54 computes, again, the error code for the payload 34 of a cell 30A arriving at egress board 50 and then comparison circuit 66 compares the result of that calculation with the payload integrity verification code 60 written in cell 30A. If the results match then it is assumed that the payload of the cell has not been corrupted during passage through the switch and the cell is then passed out of egress board 50 to egress $E_1$ by way of a converter 58. Converter 58 strips off additional header 32A and writes appropriate VPI/VCI values to fields 38 and 39 for the next link in the cell's VCC.

If the second payload integrity verification code generated by second payload integrity verification code calculator 54 does not match the payload integrity verification code 60 stored in the header of the cell then it is known that the payload of the cell must have been corrupted somewhere within switch 20 or that the payload integrity verification code 60 must have itself become corrupted. In the case of a mismatch an error is signalled. In the example of FIG. 7, an error is signalled by writing the connection identifier for the cell in question to a first in first out (FIFO) memory 67. Other action could be taken, for example, any cell with a corrupted payload could be dropped or an error signal could be delivered on an error signal line 68.

The payload integrity verification circuit may comprise, in the alternative, a calculator which computes a result as a function of a payload integrity verification code and a cell payload. The result has a first value if the payload integrity verification code matches the cell payload. The result has a value other than the first value if the payload integrity verification code does not match the cell payload. The result may be inspected to determine whether or not it has the first value. If the result does not have the first value then an alarm signal may be generated. The particular function used to compute the result will depend upon the function used to compute the payload integrity verification code. For example, if the payload integrity verification code is a parity bit then the result may be computed by computing the parity of the cell payload taken together with the payload integrity verification code.

In order to detect as many instances as possible of payload corruptions which occur inside a switch 20, it is desirable that the payload integrity verification code 60 for each cell be calculated as close as possible to the ingress at which the cell enters switch 20. The second calculation of the payload integrity verification code 60 should occur as closely as possible to the egress at which the cell leaves the switch 20.

To locate more precisely where inside a switch the payload of a cell has become corrupted it is desirable to provide one or more additional payload integrity verification circuits (in the illustrated embodiment code calculators 54 and comparers 66) at various points within switch 20. An error code calculator may be provided at the egress and ingress of each card, or other replaceable module, in a data path in an ATM switch or other telecommunications device. This enables the reasonably rapid identification of a specific card or module on which data corruption errors are occurring. This in turn enables a technician to replace the card or module to restore normal service. Each payload integrity verification code calculator 54 and comparer 66 function as described above to determine whether the cell's payload may be corrupted. If a mismatch is detected then the circuitry can signal an error condition as described above.

Where a cell may pass through two or more payload integrity verification circuits on its way through a switch 20 it is generally desirable that the first payload integrity verification circuit encountered by the cell somehow alters the cell if an error is detected. The alteration to the cell indicates to any downstream payload integrity verification detection circuits that an error in the cell has already been detected. This may be done in a number of ways. For example, at each payload integrity verification circuit which detects an error, the payload error integrity verification code (and, if necessary the header error control code 36) can be recalculated for cells identified as having corrupted payloads. The recalculated value(s) can be written to appropriate locations in the cell. Unless the cell becomes further corrupted as it passes downstream through the telecommunication device, downstream payload integrity verification circuits will read the recalculated payload error integrity verification code and will not detect that the cell has been corrupted.

In the alternative, a particular payload integrity verification code 60 may be reserved for use with cells having previously detected errors. Downstream payload integrity verification circuits may be configured to ignore cells having the reserved error detection. This has the disadvantage that a certain number of payload errors may pass undetected, but has the advantage that it does not require any extra space to be reserved in cell 30 for a flag, or the like, which could further reduce the throughput of switch 20.

Figure 8:
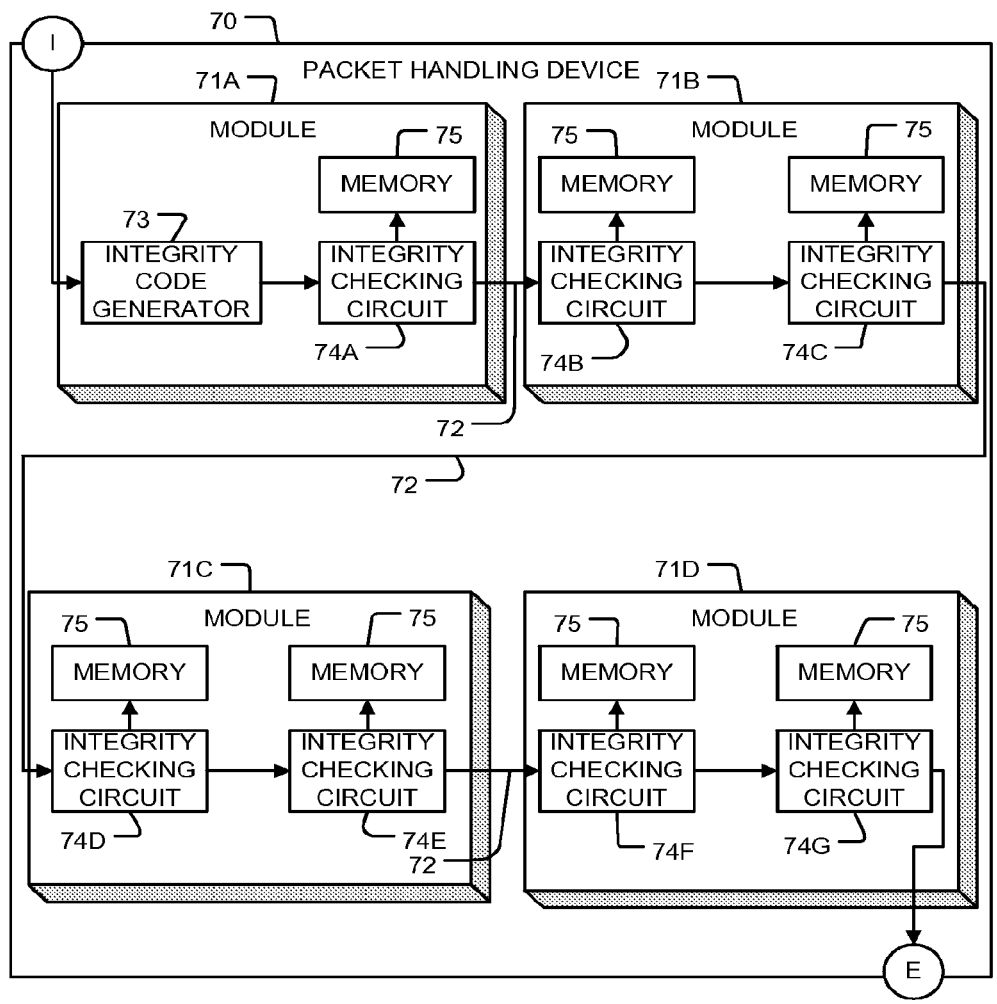
FIG. 8 illustrates a telecommunication device according to one embodiment of the invention which comprises a number of replaceable modules.

FIG. 8 shows a packet handling device 70 which includes several modules 71A, 71B, 71C, and 71D (which will be referred to collectively as modules 71) on a data path 72 which connects an ingress I to an egress E. Packet handling device 70 may be any of various kinds of devices which handle data packets in a telecommunication network. Packet handling device 70 may include other modules, other ingresses, and other egresses none of which are shown for clarity. The data packets may be of any of various types and may have fixed or variable lengths. A problem is to determine when device 70 is faulty. A more specific problem is to locate a specific one of modules 71 which is faulty.

Device 70 includes an integrity verification code generator 73 which generates integrity verification codes for packets entering device 70 at ingress I. Integrity verification code generator 73 is preferably on an ingress module 71A at a location on data path 72 which is as close as practical to ingress I. Integrity verification code generator 73 computes an integrity verification code by applying a suitable algorithm to each packet passing along data path 72. For example, integrity code generator 73 may generate a CRC-8 value, a CRC-4 value or a parity bit from all of, or a portion of, each packet. Integrity code generator 73 writes the integrity verification code to an unused field within the packet or to a header or trailer attached to the packet.

A plurality of integrity checking circuits 74A, 74B, 74C, 74D, 74E, 74F and 74G (collectively integrity checking circuits 74) are located on data path 72 at locations downstream from integrity code generator 73. Each integrity checking circuit 74 determines whether the integrity verification code in each packet matches the packet. This may be achieved, for example, as described above. If an integrity checking circuit 74 determines that the integrity verification code of the packet does not match the packet then an error is signalled. Signalling the error may include capturing a connection identifier, or other identifying information identifying the packet or a data stream to which the packet belongs, and writing the identifying information to a memory 75. Preferably, when an integrity checking circuit 74 determines that the integrity verification code of the packet does not match the packet then the integrity checking circuit computes a new integrity verification code which does match the packet and writes that new integrity verification code to the packet.

If device 70 is faulty and is causing packets to become corrupted then one or more of integrity checking circuits 74 will generate a series of error signals. The particular module 71 which is faulty can be determined by ascertaining which one of integrity checking circuits 74 is generating the error signals. This can be determined, for example, by inspecting the contents of memories 75. Locating an integrity checking circuit 74 at the ingress and egress of a module allows the module to be identified as being faulty.

Figure 9A:
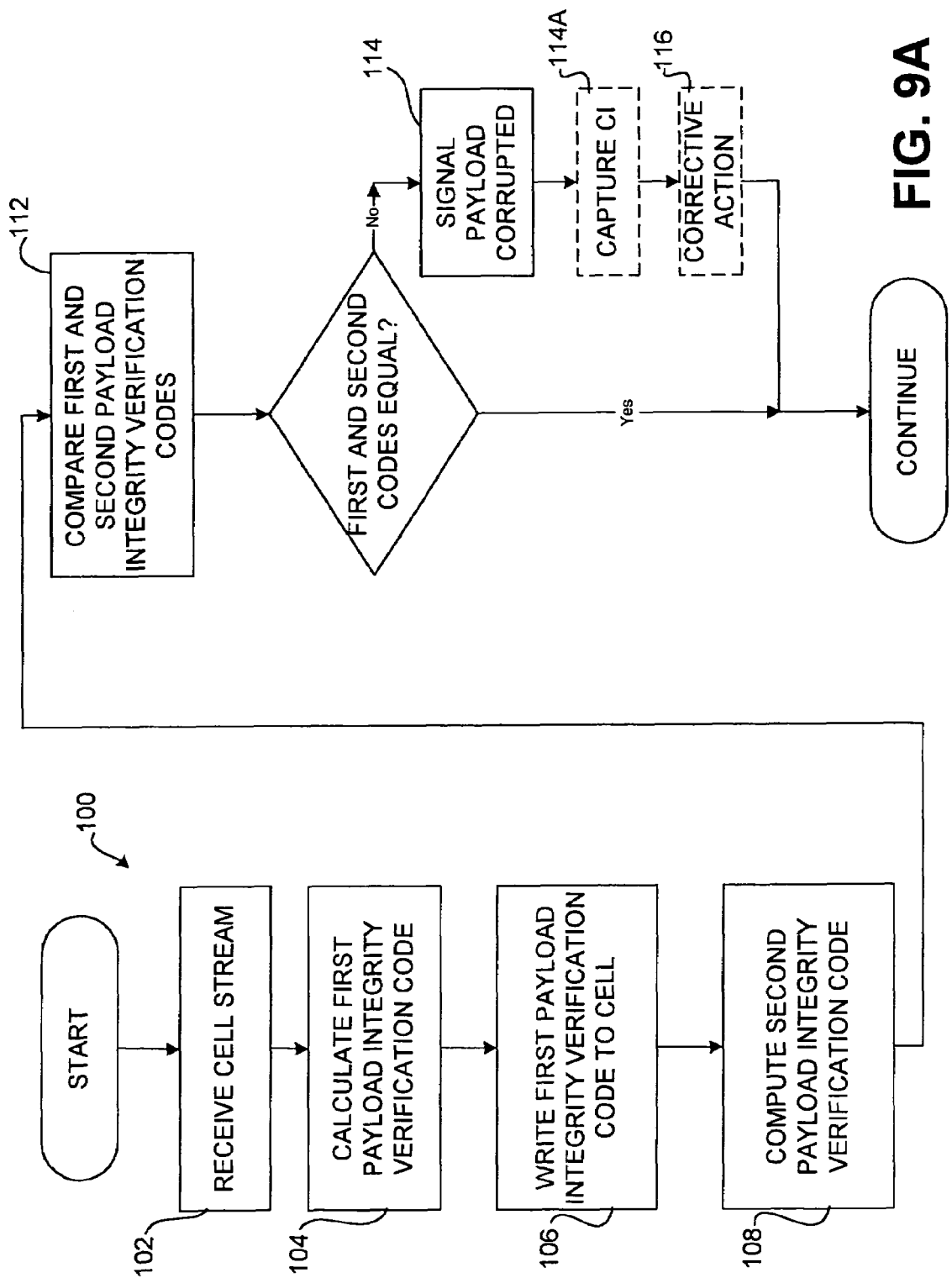
FIG. 9A is a flowchart illustrating a method according to the invention.

FIG. 9A shows a method 100 according to a simple embodiment of the invention. Method 100 begins by receiving a cell 30 at a telecommunication device, such as a switch 20 (Step 102). In Step 104 a first payload integrity verification code 60 is calculated. In Step 106 the payload integrity verification code 60 is added to the cell 30. At a second point, while cell 30 is still within the switch 20, a second payload integrity verification code is generated (Step 108). The first and second payload integrity verification codes are then compared in Step 112. If the first and second payload integrity verification codes are the same then no problems have been detected with the payload of the cell and the cell is sent onwardly. If the first and second payload integrity verification code 60 are not the same then an error is signalled (Step 114). Signalling the error may consist of, include or be followed by capturing the CI from the cell in question (step 114A). Optionally the cell may be dropped (Step 116) or other corrective action may be taken.

Where there is a cell payload integrity verifier which is upstream from another cell payload integrity verifier (i.e. where there are two or more downstream payload integrity verifiers) it may be desirable for the upstream payload integrity verifiers to alter the payload data so that additional error signals are not generated by all of the downstream checkers. This may be done, for example, by re-calculating the payload integrity verification code for each cell in which an error is detected at the upstream payload integrity verifier, writing the re-calculated value of the payload integrity verification code to the cell, and then forwarding the cell along the data path. Unless the payload data becomes further corrupted, subsequent payload integrity verifiers will not detect an error in respect of that cell.

Figure 9B:
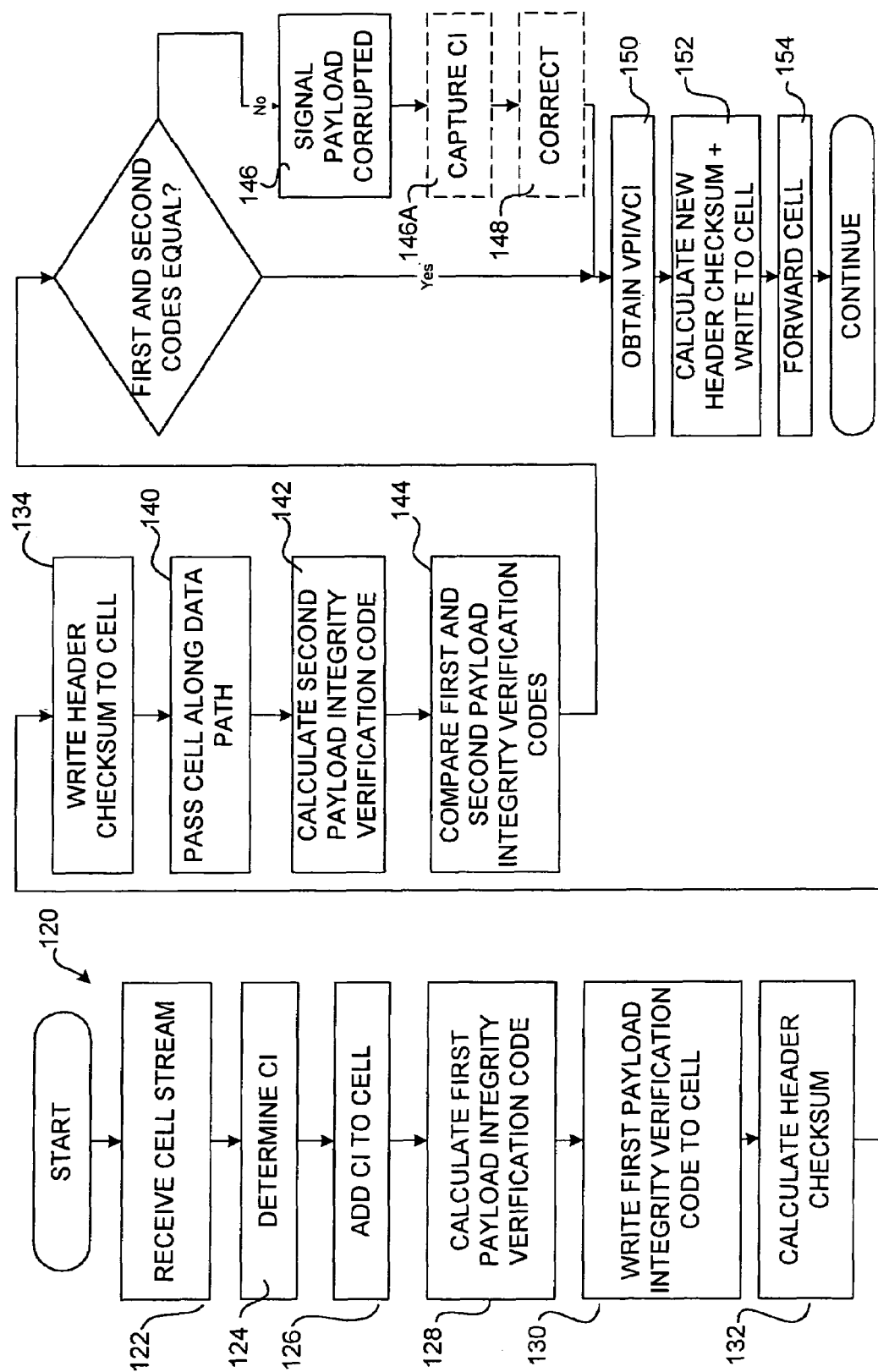
FIG. 9B is a flowchart illustrating a method according to a specific embodiment of the invention.

FIG. 9B shows a method 120 according to a more specific embodiment of the invention. Method 120 begins by receiving a cell 30 at a switch 20 (Step 122). The virtual path identifier of the cell is read and a connection identifier is generated for the cell (Step 124). The connection identifier is added to the cell (Step 126). Step 126 may involve, for example, adding an additional header 32A to the cell. In Step 128 a payload integrity verification code is generated. Step 128 may be performed in parallel with, before, or after Steps 124 and 126. Payload integrity verification code 60 is then written to all, or a portion of the VPI/VCI fields in the header 32 of the cell 30 (step 130). Subsequently, a header check sum is computed for the header 33 of the cell in Step 132. Step 132 may be performed at any time after the content of the various fields in the header 33 of the cell are known. It is not necessary for step 132 to be delayed until after Step 130. Preferably the header checksum is calculated from both header 32 (as modified by the replacement of part or all of the VPI/VCI fields with payload integrity verification code 60) and any additional headers 32A. In Step 134 the header check sum is written to the header error control field. The cell 30 passes through switch 20 along a data path determined primarily by the connection identifier (Step 140).

Before cell 30 leaves switch 20 the payload integrity verification code for the cell payload 34 is computed again (Step 142) to yield a second payload integrity verification code 60. The first and second payload integrity verification codes 60 are then compared (Step 144). If the result of the comparison is that the first and second payload integrity verification codes are the same then the packet continues to the egress of switch 20. If the result of the comparison is that the first and second payload integrity verification code 60 are not the same then an error is signalled (step 146). Signalling the error may consist of, include or be followed by capturing the CI from the cell in question (step 146A). Optionally, corrective action, such as dropping the cell, is taken (Step 148). If the cell is not dropped then the corrupted cell may be allowed to proceed to the egress of the switch 20.

At the egress of switch 20, a VPI/VCI for the next link 22 is obtained (Step 150). The VPI/VCI is written to the VPI field in header 32 and the additional header is stripped from the cell. The header check sum is re-calculated and written to the header error control field (step 152). This cell is then forwarded to the next switch (or to a network edge device 12) on the next communication link 22 (step 154).

Only hardware which is explicitly involved in the practice of this invention is shown in the drawings and described above. Other hardware which is implicitly involved in the practice of the invention or not involved is not illustrated for clarity. Such hardware is well understood to those skilled in the art of designing telecommunication devices and networks. Because modern telecommunication devices such as ATM switches typically operate at high data rates, it is often not practical to process packets, or cells, under software control. Instead, the logic for processing packets or cells in high-speed telecommunication devices is typically provided either in application specific integrated circuits (ASICs) or in field programmable gate arrays (FPGAs). Apparatus for practising this invention may be incorporated in such ASICs or FPGAs. Steps in the methods of the invention may be performed in such ASICs or FPGAs. It can be appreciated that one advantage of this invention is that it can be practised without the need to add or replace the hardware used in many telecommunications devices. Such devices are often sufficiently flexible in design that they may be configured to practice this invention without significant hardware modifications.

As will be apparent to those skilled in the art in the light of the foregoing disclosure, many alterations and modifications are possible in the practice of this invention without departing from the spirit or scope thereof. For example, while the foregoing text uses the term "header" to describe how additional information is associated with a cell, it is not necessary that the additional "header" be in any specific location relative to other data for a cell. In this application the term "header" includes a trailer which could be used to carry additional information associated with a cell in a telecommunication device.

While the invention has been described above primarily in the context of an ATM telecommunication network, embodiments of the invention may relate to non-ATM telecommunication networks. Accordingly, the scope of the invention is to be construed in accordance with the substance defined by the following claims.

What is claimed is:

1. A method for locating a faulty module in a packet handling device in a telecommunication network, the device having a data path for carrying data packets, the data path passing through a plurality of modules in the device, the method comprising:
    a) at a plurality of locations on the data path within the device reading an integrity verification code from a data packet and determining if the integrity verification code matches the data packet; and,
    b) if the integrity verification code at one of the locations does not match the data packet, generating a signal indicating that the data packet is corrupted
    wherein the device includes a plurality of replaceable modules on the data path and the method comprises:
    determining if the integrity verification code matches the packet at an egress of each of the replaceable modules;
    determining if the integrity verification code matches the packet at an ingress of each of the replaceable modules; and
    identifying as faulty one of the replaceable modules for which it is determined that the integrity verification code does match the packet at the ingress of the replaceable module but does not match the packet at the egress of the replaceable module.

2. A method according to claim 1 wherein the integrity verification code is generated at least in part on the basis of a data payload of the data packet.

3. A method according to claim 2 comprising generating the integrity verification code at an upstream location within the device.

4. A method according to claim 3 wherein the upstream location is at an input of an upstream one of the modules in the device.

5. A method according to claim 4 wherein the upstream location is at an ingress of the device.

6. A method according to claim 4 wherein the upstream location is on an ingress card of the device.

7. A method according to claim 3 comprising identifying one of the locations at which a series of error signals is being generated.

8. A method according to claim 1 wherein the plurality of locations include at least a location at an input of each of two or more of the plurality of modules and a location at an output of each of the two or more modules.

9. A method according to claim 1 wherein the device comprises a switch.

10. A method according to claim 1 wherein the data packets comprise ATM packets and the method includes carrying the integrity verification code in a header which is present only while the data packets are traversing the device.

11. A method according to claim 10 wherein the CRC value is a CRC-4 value.

12. A method according to claim 1 wherein the integrity verification code comprises a CRC value.

13. A method according to claim 12 wherein the CRC value is a CRC-8 value.

14. A method according to claim 1 wherein the integrity verification code comprises a parity bit.

15. A method according to claim 1 wherein generating the signal indicating that a packet is corrupted comprises writing information identifying the packet to a memory.

16. A method according to claim 1 wherein generating the signal indicating that a packet is corrupted comprises writing information identifying a data stream to which the packet belongs to a memory.

17. A method for diagnosing problems with a packet handling device having an ingress and an egress connected by a data path internal to the device, the method comprising:
    generating integrity verification codes for packets passing an upstream location on the data path based at least in part on data payloads of the packets;
    passing the integrity verification codes along the data path with the corresponding packets;
    at a plurality of downstream locations on the data path downstream from the upstream location reading the integrity verification codes and determining if the integrity verification codes fail to match at least the data payloads of the corresponding packets; and
    if one of the integrity verification codes fails to match the corresponding packet at one of the downstream locations generating a signal indicating that a corrupted packet has been detected at the one of the downstream locations.

* * * * *